United States Patent [19]

Ware

[11] 4,045,911
[45] Sept. 6, 1977

[54] VERSATILE HORTICULTURAL GROWTH APPARATUS

[76] Inventor: R. Louis Ware, 2108 Middlefork Road, Northfield, Ill. 60062

[21] Appl. No.: 740,872

[22] Filed: Nov. 11, 1976

Related U.S. Application Data

[63] Continuation of Ser. No. 618,828, Oct. 1, 1975, abandoned.

[51] Int. Cl.² .......................... A47G 7/00; A01G 9/02
[52] U.S. Cl. ............................................ 47/39; 108/23; 240/81 R; 47/DIG. 6; 47/17
[58] Field of Search .......................... 47/17–18, 47/39, DIG. 6; 108/23, 59, 106–107; 240/81 R, 51.11 R

[56] References Cited

U.S. PATENT DOCUMENTS

| 3,030,735 | 4/1962 | Bodkins | 47/39 |
| 3,066,445 | 12/1962 | D'Amico | 47/DIG. 6 |
| 3,314,192 | 4/1967 | Park | 47/18 |
| 3,529,379 | 9/1970 | Ware | 47/17 |
| 3,664,063 | 5/1972 | Ware | 47/39 |
| D. 225,252 | 11/1972 | Ware | D35/3 A |

Primary Examiner—Robert E. Bagwill
Attorney, Agent, or Firm—Schuyler, Birch, Swindler, McKie & Beckett

[57] ABSTRACT

A versatile yet highly simplified and exceptionally utilitarian plant growth apparatus assembly is comprised of a combination, in desired practical plurality, disposition and geometry and arrangement, of several individual and self-contained functional units and structures that are modular in nature and applicability and cooperable for engagement and association with one another so as to constitute the wanted and/or necessary resultant effective and operable assembly; the modular units being severally and characteristically in the nature of either mechanical structure members and/or environmental control systems electrical or otherwise in nature and/or light-providing components; the several said units further being peculiarly adapted for very quick and easy mounting and construction into, change and alteration within, addition to or disassembly from the structured apparatus assembly.

20 Claims, 29 Drawing Figures

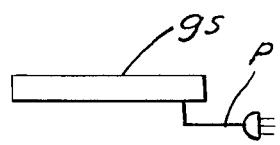
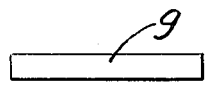
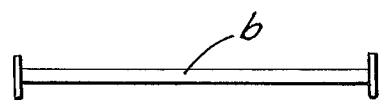
Fig. 1  Fig. 1a  Fig. 2
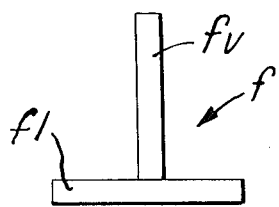
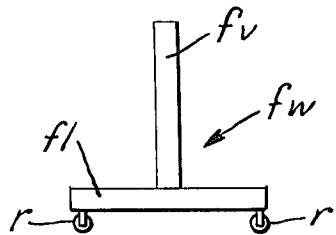
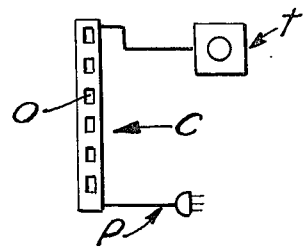
Fig. 3  Fig. 3a  Fig. 4
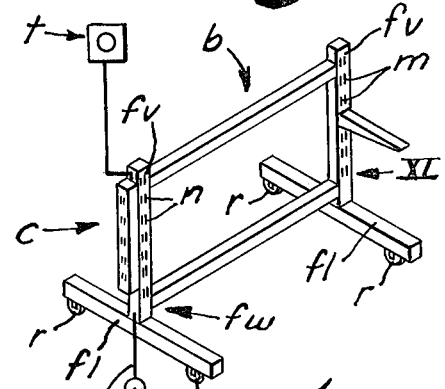
Fig. 5  Fig. 6  Fig. 7
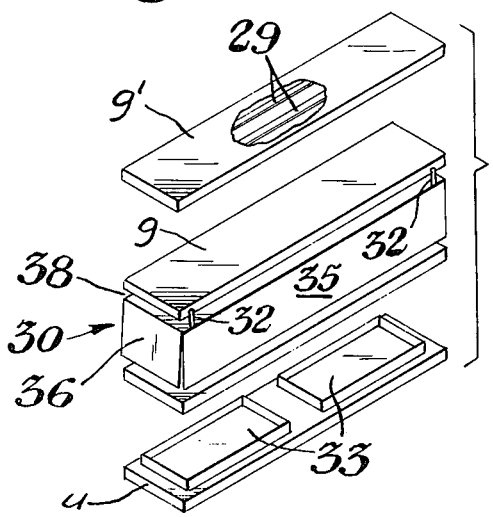
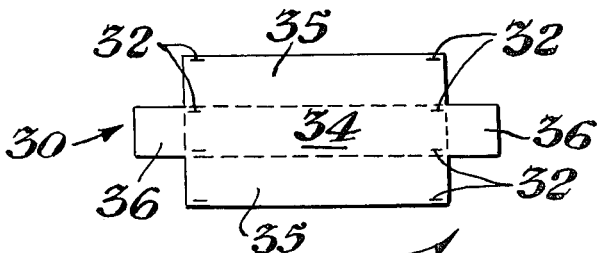
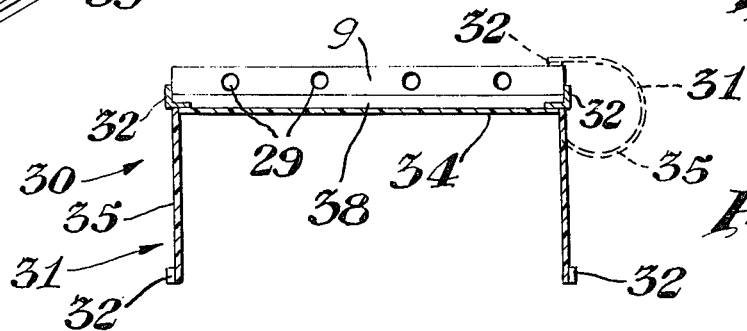
Fig. 18  Fig. 19  Fig. 20

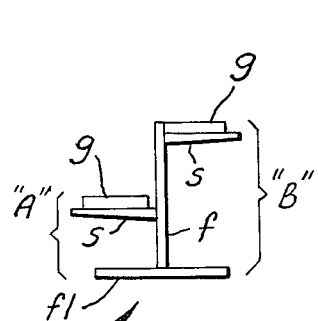 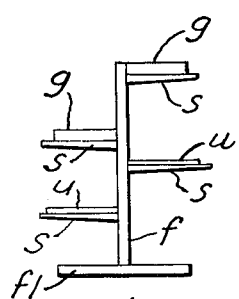 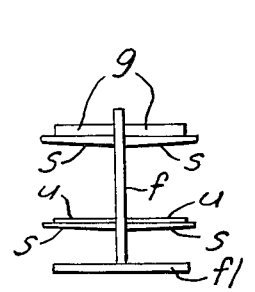 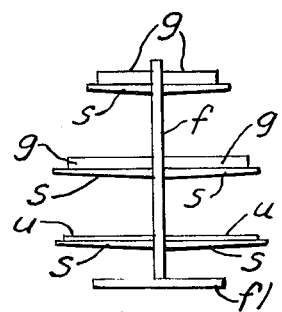
Fig. 8  Fig. 9  Fig. 10  Fig. 11
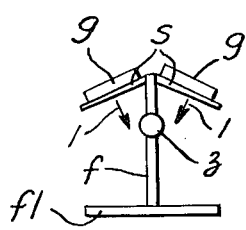 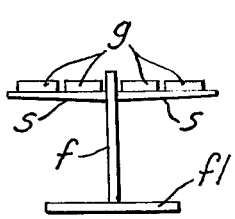 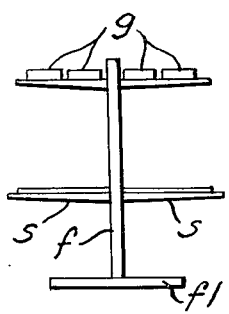 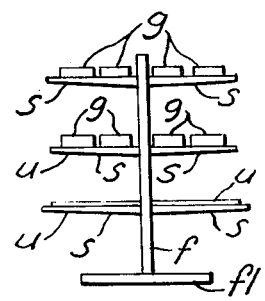
Fig. 12  Fig. 13  Fig. 14  Fig. 15
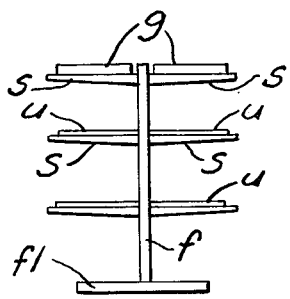 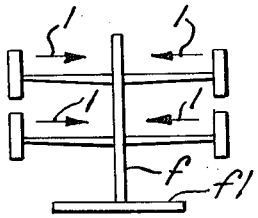 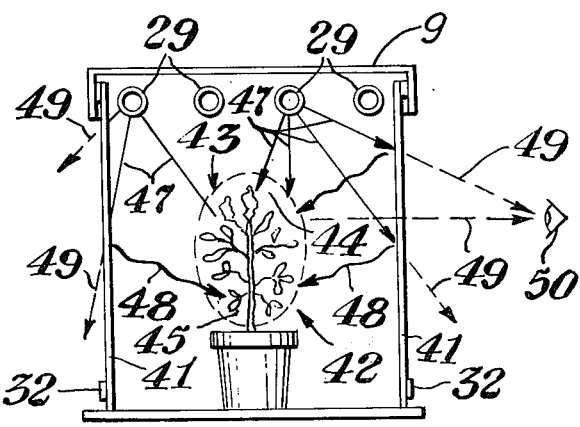
Fig. 16  Fig. 17
Fig. 21
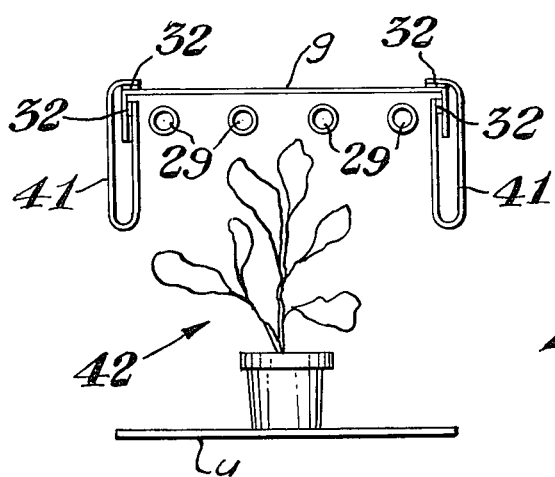
Fig. 22

VERSATILE HORTICULTURAL GROWTH APPARATUS

This is a continuation of application Ser. No. 618,828, filed Oct. 1, 1975 (now abandoned).

BACKGROUND OF THE INVENTION

The use of artificial light for plant growth dates back at least to the end of the 19th century, being particularly coincident with advent of electric lights. As is well known, the technology varies from use for the purpose of the simplest sort of individual light units to very sophisticated and complex plant growth rooms and chambers. The involved art in its various heretofore-available techniques and aspects has been extensively described, in vast quantity and proportion, in considerably numerous patent and other literature sources. As cursory collation to the subject matter of the present invention, reference may be had to U.S. Pat. Nos. 3,254,448; 3,453,775; 3,529,379; 3,664,063; 3,772,827; 3,861,519; 3,882,634; Des. 225,252; and Des. 203,493 and the citations therein amongst the multitudinous additional teachings and disclosures available in the art (such as those included, inter alia in International Search Class A01g 31/100 and so forth). Thus, no further fundamental elucidation or detailed description is necessary or required as to same for full comprehension and clear understanding of the present invention.

As will be readily apparent to those skilled in the art, the novelty and distinctive attributes possibilitated by practice of the present invention and its conceptual embodiment implementations resides in its unique and heretofore unavailable structural and electrical and other control design features and systems which provide and readily allow unusually versatile geometric configurations and versatile (expandable) planer bed areas for plant growth through the multiple vertical stacking and/or multiple lateral (i.e., side by side) addition of lighting modules to the basic support structure. As a result, this common design of the electro-mechanical system with modular shelves facilitates add-on features vertically or laterally, as desired to yield and meet growth area and dimensional requirements.

Considered figuratively in an analogous light for purposes of facilitating its comprehension, the concept and practice of the present invention may be likened to what is involved in utilization of the popular Tinker - Toy game toy equipment wherein and with which relatively standardized components may be readily coupled and inter-related and combined to achieve a desired end result.

As is hereinafter more fully and particularly delineated, the modular elements or features and components employed in related and associated combination in practice of the present invention in order to provide the extremely simple, versatile, utilitarian and changeable (including contractable or expandable) apparatus obtainable thereby include, without necessary limitation thereto:

1. At least two upright support columns which are notched or otherwise provided for quick-coupling purposes to receive and hold brackets or supports for plain base shelves and modular plant lighting units that combine shelf space and light-providing capabilities in a single integral structure; each of said units having lateral leg supports which may be provided with rollers, casters, slides or the like to lend mobility to the apparatus;
2. Generally at least a pair of quick-coupling lateral stretcher and frame rigidizing bars which interconnect the upright columns;
3. A multiple electrical outlet plug mold stripping mounted vertically to or provided as a built-in element of at least one of the vertical upright structural members to provide electrical connections for the modular lighting fixtures employed;
4. A single power source return which is interlocked with an electrical timer that can be adjusted to the desired photo period of plant materials;
5. At least a single modular unit that is a combined light source and shelf fixture which provides illumination from one of its sides (usually the under side) and a shelf area on its opposite side so as to provide a unique requirement for the apparatus to function as a multiple level planer bed for plants; which fixture is so arranged as to be adapted to concentrate heat from cathodes and and transformers on peripheral boundaries of the total apparatus, thus dissipating heat away from plant materials (taking into account that conventional lighting fixtures now available on the market locate ballast transformers in the central position above lights so that heat from ballasts is concentrated at the center point of fixture which is likely detrimental to plant materials especially if any number of said fixture modules are combined together);
6. The possibility of achieving both vertical and lateral stacking of plant growth shelves (whether simple supports or light-providing modules) to facilitate many varied geometrical and and dimensional growing areas for plants;
7. Apparatus assemblies that can either be floor or counter-top mounted, and mobile or fixed in nature;
8. Built-in timer controls whereby a timer circuit may be interlocked in series with the main power source to enable the power circuit to coincide with any given desired photo period for light exposure of plant materials being contained in the assembly, this being a further refinement of the indication in Paragraph (4) above;
9. The very easy possibility of variable spacing of shelf areas according to plant material, lighting and spacing requirements between light-providing fixtures and other (like or plain) supporting shelf areas carrying plant materials;
10. The potential for employment of the light-providing fixtures so as to achieve variable direction of illumination to the plants being grown;
11. The very easy possibility of readily adding additional auxiliary shelf space to neatly and very efficaciously accomodate within the apparatus desired functional units and systems such as means for irrigation and/or humidification and so forth; and
12. The facile capability of including such desirable plant growth affecting adjuncts in the apparatus combination as reflective, semi-transparent medium for optimizing incident light energy to plants while containing same within the apparatus and at the same time allowing excellent viewing thereof and/or actual plant enclosing devices to insulate the growing material from excessive heat generated by the light source and/or otherwise more closely control the atmosphere for growing to which the plant is subjected.

FIELD AND OBJECTIVE OF INVENTION

The field in which the present invention resides and the improvement to which it pertains, as well as the primary and general purposes to which it relates and the aims, objectives and advantages which it achieves, is the improvement in horticultural plant growth apparatus which is assembled to meet requisites and/or desiderata with and from a highly versatile — yet simplified — combination of modular fixtures, structures, systems and accessories which very beneficially inter-relate and inter-cooperate so as to achieve, in a most simple and concise summarization:

A. Optimized plant growth conditions; from

B. A single basic structural hardware system which easily, efficiently and most economically allows for ready apparatus alteration which achieves any desired variation of structural configuration and accessory inclusion to provide the most advantageous possible assembly for any given need ensuring optimum growth conditions of the plants involved in any encountered situation of practice.

Practice of the present invention generally provides the desired and indicated novel results and possibilities, with great attendant artistic effect having readily-apparent and quite pleasing observability thereabout, to an extraordinary and remarkable degree; all this being achieved with utmost ease, simplicity, versatility, economy and effectiveness.

The above-indicated and many more and other of the benefits and advantages in and obtainable by and upon practice of the present invention are more particularly set forth and easily evident in the ensuing Specification, taken in conjunction with the accompanying Drawing, wherein: FIGS. 1 through 27, inclusive, depict in generally schematic and/or symbolic and/or fanciful portrayal with many obviously purposefully simplified exaggeration of details (each view being more fully particularized and explained in the following) the various components and members possible to utilize in practice of the invention and the various results and embodiments for indicated purposes and with explained inherent advantage and benefit that are thereby obtainable.

PARTICULARIZED DESCRIPTION AND EXPLANATION OF THE INVENTION

FIGS. 1-27 (including, of course, FIGS. 1a and 3a) render even more readily apparent and discernible the many meritorious objectives and advantages of the present invention as are evident in what is above indicated.

Referring first to FIGS. 1-6, 1a, 3a and 7 the basic modular building elements utilized in present practice are schematically shown. As will be readily comprehensible to those skilled in the art, single and multiple combinations of the modular elements or parts depicted in the first eight FIGURES of the DRAWING are utilized to provide one or more apparatus assemblies in accordance with the present invention. FIG. 7, to preliminarily demonstrate how an assembly is constructed, perspectively shows a partially finished embodiment containing only the modular components of FIGS. 2, 3a, 4 and 5.

A single modular combined light source and shelf is schematically designated gs in FIG. 1, this being the unit described in the numbered Paragraph (5) in the foregoing, a most advantageous embodiment of which is also more extensively described in the following in connection with FIGS. 25-27 of the Drawing. A relatively short electric cord and plug attachment p for the combined shelf and light unit is shown attached in FIG. 1. For simplicity in identification and as it will be generally shown in the other involved views of the Drawing, the integral shelf-light modular unit is identified as g in FIG. 1a wherein the cord and plug p is deleted (although it is to be understood that this is usually necessary to connect unit g to the electric power supply).

Advantageously, the combined, integral shelf and light providing unit gs (and g) is an open-bottomed rectangular box-like structure with the upper surface useful as shelf space when installed in many of the assemblies according to the present invention. It also contains the necessary ballast and other incidentals and wiring necessary for operation of the generally fluorescent lamp tubes contained therein. Ordinarily (in either standard or special horticultural grade quality), 48 inch fluorescent lamps are employed and 4 of them are contained in each of the combined shelf-light module units employed in practice of the present invention; although obviously and as may be alternatively desired shorter or longer length (and even different yet suitable types of) lamps can be used and more or less than 4 lamps may be contained in each unit. The contemplated units are preliminary and in basic essence disclosed in U.S. Pat. No. 3,772,827, especially in connection with FIGS. 7-9 of that patent. For simplicity and convenience, they are hereinafter referred to as "grow-shelves" or, in the singular, as a "grow-shelf".

A lateral stretcher bar is designated b in FIG. 2. This interconnects with and supports at least a pair of the upright vertical support frames f illustrated in FIGS. 3 and 3a. As can be provided by anyone skilled in the art, the extremities of each stretcher bar b have any desired sort of quick-fastening attachments thereon which mate with receptacles or equivalents of the upright, or vertical support posts fv of each frame f. Ordinarily, the male part of the quick-fastening coupling is on the stretcher bar b and the female union at a desired location on upright fv, although the opposite arrangement is also possible and satisfactory. The frame f has feet or leg portions fl to support the assembly on any desired surface. If ready mobility or a roll-about feature is desired in the assembled apparatus, the leg sections fl can be provided (as is depicted in FIG. 3a) with suitable rollers, casters, slides or the like identified by reference letter r. Ordinarily, at least two stretcher bars b are interconnected at suitable upper and lower spacings with a pair of vertical supports f to construct a rigidized frame such as that shown and designated X1 in FIG. 7. The frame, obviously, may be of any desired dimemsions to accommodate whatever size and/or strength apparatus assembly is wanted or needed. Likewise, although not shown, single frames of exceptional length with an economy of vertical support members may be made by serially interconnecting a plurality of upright supports with appropriate numbers of stretcher bars with the intermediate uprights having coupling accommodations on both sides thereof.

FIG. 4 schematically illustrates with reference letter c the electric plug outlet mold strip with an interlocked timer t (which may advantageously be wired timer into the strip). This mounts on the vertical upright fv perpendicular to the two faces of the upright and faces outside of of the frame X1. This plug mold strip c receives the individual plugs of each grow-shelf when the unit is assembled. The time clock sets the desired photoperiod (light cycle for plants). The plug mold strip receives all of the light shelf plugs so that only one plug cord p is connected to the power source.

Generally the electric plug strip c extends from near the bottom to near the top of the vertical support fv on which it is attached. Any desired number of outlets o may be in the strip, it being advantageous to have them spaced at relatively close intervals of between, say, 3 or 4 inches and a foot or so in order that minimum extension cord lengths in the plug cord p from each grow-shelf gs may be utilized. Of course, the strip c can be actually built into and be contained within an outside (or other face) of a vertical support fv. Likewise and for the sake of neatness, appearance and safety, the power cord p for strip c (whether or not it is exteriorly mounted or contained with the upright) may be threaded interiorly in the upright to emerge at the bottom portion of the frame f.

As shown in FIG. 7, each upright support fv has on one or both of its front faces a number of spaced and purposely-positioned notches, designated n, or equivalent quick-coupling means to interact with and receive cooperating elements on each shelf support bracket identified as shown in both FIGS. 5 and 7 by reference letter s. The notches or the like n are regularly spaced at desired small intervals to give great adjustment flexibility in vertical disposition and placement of both the grow-shelves that are employed in the assembly as well as for plain base shelves, designated u in FIG. 6; which base shelves are merely flat, planar surfaces of adequate dimension and strength that are made without lights and used at the bottom of the assembly or in other desired locations therein and are also mounted on brackets c which are fastened to notched uprights fv. The base shelves not only hold plants, but may also support irrigation tanks or humidifiers and the like or other elements especially when they are used as a second or sub shelf installations below plants contained in the apparatus.

Obviously, the length of each support bracket s advantageously exceeds the width of each of the grow shelf units g or base shelves b (or side-by-side multiples thereof) that are laterally supported thereon.

Utilizing the letter designations for various basic building block components that have been explained in connection with the illustrations of FIGS. 1-7, 1a and 3a, various concepts for a wide variety of apparatus assembly embodiments in accordance with the present invention are fancifully depicted (from end-view vantage points) in FIGS. 8 through 17, inclusive.

Thus, it is frequently quite desirable and most advantageous when utilizing plant growth apparatus in accordance with the present invention to start the plants (from germination or at early stages) in a space with limited head room (such as the vertical space designated as zone A in FIG. 8) and later, when larger plant size is acquired and more accommodating room therefore is needed, to transfer the plants to an area in the apparatus having greater head room (such as vertical space B also shown in FIG. 8).

In this way, the top of plants get high light energy when close to the lamps in the grow shelf when they have been started in zone A and subsequently transferred into zone B.

FIGS. 8 and 9 depict variations of the same concept, with the assembly of FIG. 8 being often attractive for table top mounting of the apparatus.

FIG. 9 illustrates a floor model having two base shelves and two grow shelves.

Figure 23:
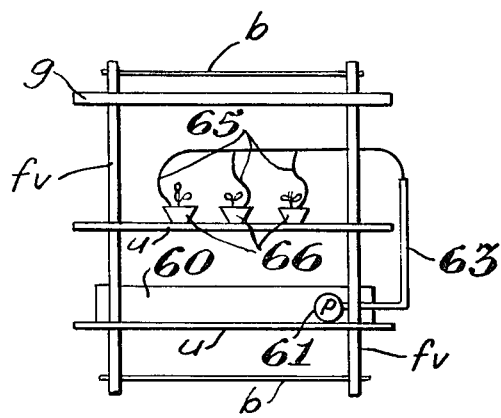

A model particularly well suited to go on the floor with four grow shelves and two base shelves therein illustrates vertical stacking in apparatus shown in FIG. 10 according to the invention. FIG. 11 shows how a grow shelf in the stack doubles as a light source and shelf for plants under illumination from top level of the grow shelves.

FIGS. 12 and 17 show variable positions of grow shelves to provide direct light from them in any direction desired.

The assembly shown in FIG. 12 is suited for single axis clinestat operation illumination according to the general teachings of U.S. Pat. No. 3,882,634 when light must be perpendicular to a rotating cylinder. Note that arrows designated l indicate the direction of light and letter z indicates the cylindrical plant growth clinestat.

Illustration of lateral expansion of growing area by addition of four grow shelves to one horizontal plane is shown in the lower (better for table tops) and higher (better for floor mounting) variations depicted respectively in FIGS. 13 and 14.

FIG. 15 shows how vertical and lateral expansion of plant growth area may be gotten by added horizontal and vertical layers of shelves.

In FIG. 16, an assembly is illustrated wherein each grow shelf has a double layer of base shelves thereunder to support humidifiers and/or irrigation tanks and/or other accessories wanted in the assembly.

Incidentally and in connection with further elucidation of at least some of the several modular elements and the various assemblies described in connection with FIGS. 2-17, certain of the interconnecting techniques described in U.S. Pat. No. 3,664,063 may oftentimes be advantageously utilized.

Plant growth apparatus assemblies in accordance with the present invention may also advantageously incorporate other desired features and appliances to ameliorate and beneficiate the favorable conditions to which the plants are subjected in the apparatus.

For example, environmental enclosures for plant growth have been constructed from many different materials and embodied in numerous configurations in order to achieve a desired physical barrier between plant materials in a specific growing area and an external environmental condition. The basic relevant art is established, although many heretofore unknown improvements thereon (such as that here described in connection with FIGS. 18-20 of the Drawing) are novel and representative of substantial improvement for the purpose.

Thus, a simplified design of an environmental enclosure together with a unique fastening method for positioning said enclosure to a plant growth fixture such as the present apparatus may oftentimes be utilized with advantage in practice of the present invention.

More particularly, FIG. 18 shows an enclosure, designated generally by reference numeral 30, which is in the form of a rectangular parallelogram with enclosure on five sides and an open underside. Advantageously, this is of a clear and transparent — most desirably although not necessarily flexible and pliant — plastic material. If desired, its inner surfaces may also be reflectorized by vacuum deposition of a metal on its inner side wall surfaces so as to achieve and provide mirroring capabilities and effects.

The enclosure 30 is utilized to shield and protect the plants under the grow shelf unit g in the general assembly designated overall as X2 in FIG. 18. The enclosure 30 may be readily made up starting with the sort of pattern shown flatly laid out in FIG. 19, wherein the top cover section is designated by reference numeral 34 from which extend the dependant end sections or flaps 36 and side sections or flaps 35. When formed along the fold lines shown, the enclosure is fabricated from the pattern. Magnetic or other supporting and/or hooking or fastening devices or means, including grommets, support the enclosure under the light source and/or to keep a side flap securely up and out of the way when elevated, are designated by reference numeral 32; these being generally situate at perimeter corners of the top section 34 and/or side sections 35 of the enclosure 30.

In FIG. 20, the grow shelf unit g is also shown in a projected or exploded position wherein, as identified by the reference g', its upper surface is partially cut away revealing fluorescent light tubes 29 contained therein. FIG. 18 also illustrates how the transparent enclosure 30 is positioned under the grow shelf with the mechanical fastening devices 32 securing said transparent rectangular parallelogram enclosure 32 to the fixture g. The enclosure 30 remains suspended beneath fixture g with an air space 38 between the light source in the grow shelf and the top 34 enclosure 30 which allows free cooling movement of air between the two elements. Heat generated from fixture g is dissipated by air convection through this space 38 between the grow shelf and enclosure 30. Assembly X2 is also illustrated with a lower growth shelf under which there is a base shelf u upon which are positioned some trays for plant growth bed containment.

As mentioned, the transparent enclosure in the shape of a rectangular parallelogram is provided in combination with any desired mechanical fastening means at its perimeters. These may be hooks, grommets, magnets or the like or equivalent which facilitate fastening the enclosure to the base of the shelf-light fixture g in order to have a simplified means of attaching and removing the enclosure in and from the assembly. The mechanical fastening means employed are positioned so as to provide the mentioned air clearance between the grow shelf unit and the environmental enclosure in order to prevent as much excess heat as possible from the light source from being transmitted to plant material inside of the environmental enclosure.

In actual practice as has above been indicated, the enclosure 30 advantageously has the magnetic fastening devices, hooks or grommets 32 located on the edges of its base perimeter. This makes for a very simplified means of keeping lifted flaps up and positioned over the top of the grow shelf giving easy access to the plant materials that are within the enclosure 30. A more particularly illustrated presentation of this is made in the figurative cross-sectional view of FIG. 20, wherein magnetic fasters are illustrated to be holding the enclosure in downwardly disposed (i.e. normally effective) suspension under the grow shelf while, in dotted outline, one of the side flaps 35 is shown to be folded upwardly to open the enclosure. The flaps shown in dotted outline is maintained in the open position by another magnet 32 (affixed inside the bottom of the flap) which engages the metallic upper part (or shelf portion) of the housing of the grow shelf and keeps the opened flap up in such position.

Special mention may be made of a particularly advantageous result and benefit provided in and obtainable with certain embodiments of apparatus that are possible to easily assemble in practice of the present invention, this being when at least a pair of the grow shelves are vertically superimposed in the construction so that the upper shelf portion of at least one of the lower units is available as a plant growth area. Such an arrangement is depicted in the assembly X2 portrayed in FIG. 12 as well as in the variations demonstrated in connection with FIGS. 11 and 15. The lower grow shelves tend to provide a nicely heated upper surface area upon which growth may take place, especially for germination of seeds into sprouts, and so forth. It has often been stated in matters horticultural that ideal growth conditions take into account the premise that, ordinarily, growing plants flourish best with "cool heads and hot feet". This, as indicated, is most fortuitously accomplished in such embodiments having directly superimposed grow shelves as shown in the embodiments contemplated by FIGS. 11, 15 and 18, especially when the warmth of seed beds is desired to be ensured.

FIGS. 21 and 22 specifically illustrate another very advantageous and desirable sort of accessory that may be employed with and embodied in apparatus assemblies in accordance with the present invention. More specifically, mirrorized systems of providing more efficient and effective use of light energy and which also contribute to establishment of a protective environment and a very pragmatic and extremely practical means of handling and viewing plants grown under artificial light are very beneficial adjuncts for utilization in practice of the instant invention. Some mention of this is to be found in U.S. Pat. No. 3,529,379, particularly in connection with FIG. 4 of that patent.

In any event, the heretofore known embodiments and realizations for the growth of live plant material under partial or complete artificial light as distinct from sunlight alone all have at least one common objective, namely, that of optimising the use of electric power for light energy while providing a desired environmental condition, and ergo also providing a means of growing plant materials with artificial light and without any absolute necessity for sunlight.

Along this line, it is generally true that:

a. Artificial light from a source directed towards plant material does not make complete use of the light since light which is propagated from a point source is emitted in all directions with that portion which does not strike the plant being unused and wasted;

b. Light from a point source provides direct light to the plant surface but does not provide light to the sides or bottom of plant foliage, this tending to concentrate growth on the side facing the light, with a void or limited growth elsewhere;

c. Artificial light is available from a variety of lamps, even though one very efficient system comprises the use of a fluorescent tube operated by ballast transformers, the fact being that high powered fluorescent tube and ballast combinations produce high light output useful for plant growth; with and on the other hand such lighting systems producing excessive heat injurious to plants and being wasteful of energy — even though smaller, low-powered fluorescent lamp and ballast systems may have the advantage of giving off less heat but also give out less energy for plant growth; the problem being to provide a way to make highly efficient use of the light emitted from a relatively low-power system thus providing for adequate growth and energy savings; and while d. High light levels for plant growth may be as much as 10 to 50 times above other indoor lighting, a problem with such high intensity lighting is that the high light level contrast between exterior lighting (as, for example, in a school or home) compared with the high output of very intense plant growth lighting system may actually render the light for plant growth to be so bright as to be distracting, unattractive, and, therefore, unpleasant; so that e. Since plants require an environment suitable to their specific needs, such as optimum humidity level and sometimes atmosphere enrichment with $CO_2$, it is in consequence frequently desirable or necessary to provide an environmental enclosure to separate physical environment of plant growth area from exterior environment.

There exist techniques which have singularly solved some of the individual foregoing problems. For example, a mirrored or glossy finish on the surface of an enclosure surrounding a lighting system for plant growth provides reflective light. This increases light levels through incident light to the sides of plant material not in the direct exposure of the source. Enclosures for such systems are generally opaque. In order to view plant materials in this sort of arrangement, the enclosure must be either removed or opened. This, of course, creates obvious drawbacks inherent in such a system.

Alternatively, transparent enclosures of glass and/or plastic are used to maintain a desired internal environmental condition. These, however, give little or no reflective incident light from the enclosure surface to the sides of plant enclosed therein. Metal foils are also sometimes used as a reflector curtain. But such material is opaque and fragile.

All of the foregoing described techniques provide in part a solution to improve environment and make more efficient use of light; yet none of them offer a single solution to all needs outlined for most desirable solution of the foregoing problems.

While the described existing techniques can clearly be employed in the present apparatus, there is a particularly advantageous and hitherto unknown means and procedure for providing a unique and most beneficial environmental enclosure in embodiments of the present invention which gives:

i. Increased light level for the top and sides of the plant;

ii. Maximizes light energy from an existing source with minimum energy to maintain a minimum of excessive heat buildup within the plant growth system; and iii. Provides an enclosure which, while maintaining the desired plant growth environment, also eliminates the problem and undesirable consequence of room lighting contrast and allows optimum and problem-free plant viewing.

The last-described environmental enclosure most advantageously utilized in apparatus assemblies according to the invention is illustrated more specifically in FIG. 21 (which is an end view in sectional depiction of a lighting fixture with illumination by fluorescent tubes) and FIG. 22 which is another sectionally depicted view of the same lighting fixture with fluorescent tubes with the enclosure in an opened condition.

In FIG. 21 a grow shelf unit g operated by fluorescent tubes 29 is shown. The material 41 is a transparent medium (most advantageously of plastic) with a vacuum deposited coat of metal of minute thickness to render said medium transparent as well as reflective, which material may be conveniently described as being "reflective/transparent". Reflective/transparent material 41 is fastened by magnets or mechanical methods to the perimeter of the grow shelf as shown in FIG. 21.

A plant material 42 rests on a base (which is shown but not designated in FIG. 21) and receives direct light, as indicated by the direction arrows identified by reference numeral 47, from the fluorescent tubes 29 to the upper growth zone 44 of the plant in the overall growth zone taken within the dotted ellipse identified by numeral 43. Reflected light, from the inner sides of reflective/transparent medium 41 following the path of the serpentine arrows 48, illuminates the lower growth zone 45 of the plant 42.

Light energy (as indicated by the dotted arrows 49) also passes through reflective/transparent medium 41, this being emitted in diminished intensity as most of the initial light energy 47 is reflected back from surface of reflective/transparent medium 41 as light 48.

Position 50 represents a viewing point outside of the enclosure where light is received at a lower intensity energy (as illustrated by arrows 49) due to its diminishment upon passage through reflective/transparent medium 41.

The reflective/transparent material 41 provides environmental barrier for plant material 42 on one or more sides of the grow shelf unit g, as desired. Means of fastening the reflective/transparent medium 41 may comprise mechanical connection made with hooks, eyelets or, quite advantageously as is shown in FIG. 21, by magnet pieces 32 bonded to the reflective/transparent medium 41 which affix magnetically to the side wall, preferably the inner one, of the grow shelf housing.

As shown particularly in FIG. 22, access to plant specimens illustrated is made possible by magnetic tabs or pieces (also identified by reference numeral 32) which are fastened to the base point of reflective/transparent medium 41 so as to enable a folding to a secondary position of the reflective/transparent medium 41. The upwardly folded medium 41 is, as is apparent, held in the open position and condition by the fastening effect of the magnets 32 on the housing surface of the medium is suspended.

Another particularly advantageous means for handling the reflective/transparent medium 41 in order to achieve open and/or partly open dispositions thereof between shelf stages in the apparatus is to provide it as a supply in suitable length on an ordinary window shade roller or the like (not shown) which is hung at or near the outer lower longitudinal edge of the involved grow shelf. Most attractively and neatly, the roller carrying and supply means is placed and secured within the grow shelf housing along the inside surface of outer longitudinal front edge or face of the housing in the space there between the front side wall of the housing and the adjacent outermost fluorescent light tube in the housing. Opening or closing of the enclosure to any desired position is thus very readily done by simply pulling stored reflective/transparent medium 41 from the roller to close and winding it back onto the roller to open.

It is frequently desirable to effect a slight separation of the reflective/transparent medium 41 at the corners of the grow shelf to permit excessive heat from the lamps to be dissipated through convection. A further reduction in heat may be achieved through embodiment of a transparent medium which is positioned either between the grow shelf and the reflective/transparent medium 41 or attached directly to said reflective/transparent medium as a perpendicular horizontal plane to the vertical panels facilitating free dissipation of heat on a plane directly above the enclosed environmental system.

Figure 24:
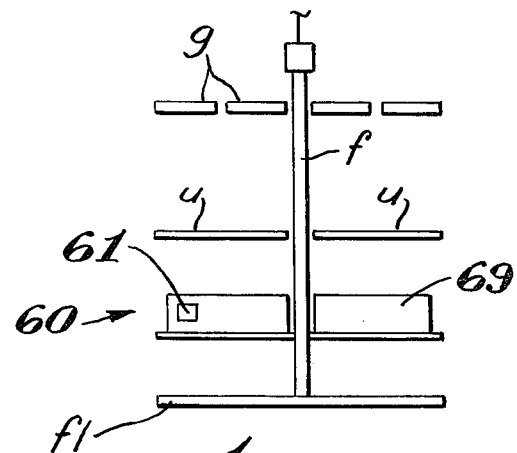

FIGS. 23 and 24 schematically illustrate apparatus assemblies in accordance with the present invention containing, as integral parts of the overall structure embodiment, added desirable functional auxiliary units.

Thus, the assembly illustrated in a fanciful front view in FIG. 23 has a superimposed grow shelf over a base shelf *u* on which a plurality of plants 66 are positioned for growth directly under the light in the apparatus. A second base shelf is provided beneath the plant-bearing shelf in the lowermost shelf facility provided in the apparatus. An irrigation tank or reservoir 60 for water supply is most conveniently placed on and supported by the lowermost base shelf *u*, so that the assembly is integral and self-sufficient as to watering requirements. The plants 66 are watered from irrigation tank 60 by any suitable and effective means desired, including flooding, spraying, misting and so forth. For example and as is figuratively illustrated in FIG. 23, a so-called (and commercially available) "Chapin System" may be utilized for individual plant or plant bed irrigation. In this, the water is passed by means of a pump 61 (or under other suitable pressuring) through a main supply conduit 63 into and through a plurality of smaller individual draw off leads or capillaries 65 that are placed to directly feed water to individual plants or plant beds. Usually in order to maintain the water discharge end in the desired irrigation place during water discharge and at other times, lead or other weights (not shown) are affixed at the end of each draw off capillary.

In FIG. 24 there is depicted in fanciful side portrayal another apparatus assembly having shelves extending laterally from both sides of the frame *f* in the same sort of disposed arrangement depicted frontally in FIG. 23. In the apparatus shown in FIG. 23, the upper planar bilateral disposition of grow shelves is multiple on each side of the apparatus, there being (also analogous to the depictions of FIGS. 13, 14 and 15) two grow shelves in side-by-side relationship on each side of the frame in the assembly so that a total of four grow shelves are contained as the top planar and light-providing element in the assembly. On one of the lowermost base shelves *u* there is an irrigation unit 60 as described in connection with FIG. 23. On the other and opposed lowermost base shelf *u*, a humidifier 69 (of any desired and appropriate type or selection) is installed to provide proper and/or desired moisture level(s) in the atmosphere surrounding the plant material being maintained and grown in the apparatus.

In this connection and with reference to ideal materials of construction for the base shelf units that are utilized in assemblies made in accordance with the present invention, it has been found that (even though any adequately strong and relatively stable material — also taking corrosion resistance into account — may be employed) it is particularly advantageous and beneficial to use an open-structured or foraminous sheet or the like for the purpose. Ordinary wire screen mesh, lathing and the like is thus oftentimes quite satisfactory. Such material, if necessary, can easily be protectively coated; and, especially when humidifying means are included as an integral part of the contained apparatus, are quite advantageous in facilitating good inter-shelf or inter-level access, as it were, by permitting free and easy atmospheric circulation around and about the plant material being handled and grown in the assembly. Apertured base shelves also tend to simplify maintenance and cleaning due to dirt and/or soil or water spillage.

An apparatus assembly according to the invention equipped with integral humidifying means (as is shown in FIG. 24) provides many benefits and advantages. Such an apparatus, although not so illustrated in FIG. 24, may if desired be also provided with any suitable enclosure means, including those novel types particularly set forth in connection with FIGS. 18–22. In any event, self-contained humidification capability in apparatus according to the invention (with or without associated enclosures) permits excellent climate control at practically any desired moisture or humidity level for the particular plant growth involved despite the ambient general humidity of the room atmosphere in which the apparatus is situate. Advantageously, (although it can be manually operated) the humidifier means is automatically timed and functionally cycled with incorporated sensor controls to better accommodate plant growth requirements. This is particularly the case when the plants being grown are placed on a foraminous base shelf over or otherwise above the base shelf on which the humidifier is positioned. In other words, a growth-favorable micro atmosphere is thereby readily achieved in order to provide a very good growth climate for the plant material; this aspect oftentimes being more readily realizable in the instances when enclosures are embodied in the apparatus. By way of illustration, it is possible without difficulty when a humidified embodiment of the present apparatus is employed to achieve a 50% or so relative humidity in the plant-surrounding atmosphere that is effective for plant growth around the apparatus even though the outside relative humidity is as low as 10% or so.

Figure 25:
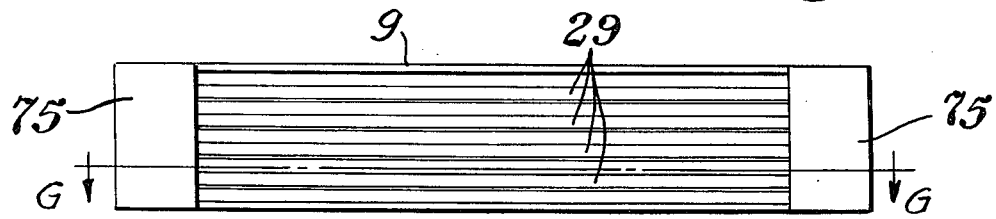
Figure 26:
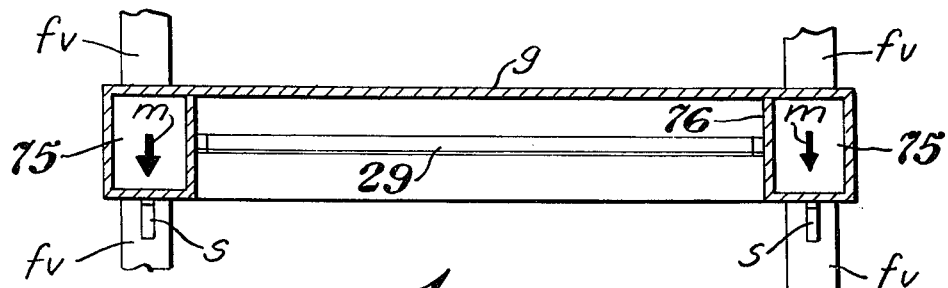

FIGS. 25 and 26 illustrate with particularity an improved and advanced embodiment of very utile and practical combined integral shelf and light-providing module or fixture unit that may most advantageously be utilized as an essential element or component in combined apparatus assemblies made and provided in accordance with the present invention; FIG. 25 being a schematic plan view from the underside of such an improved grow shelf unit *g* showing fluorescent tubes 29 exposed and having end sections or encasements 75 in the rectangular box-like structure extending for some distance from and beyond the affixed and mounted ends of the fluorescent tubes 29; and FIG. 26 portraying such an improved grow shelf unit as viewed from its outer front edge when taken along Section Line G—G in FIG. 26 with the grow shelf installed in an assembly (depicted only partially as a fragment) on support bracket arms *s* positioned in the accommodating vertical upright supports *fv* of the assembly. FIG. 26 also shows the inner support wall 76 enclosing the end encasement sections 75 on which the sockets (not shown) for mounting and holding the tubes 29 are located.

Although they are not shown since they are standard and well known items, the ballast transformers and other heavy components for and of the electrical circuitry necessary for operation of the fluorescent tubes 29 in the grow shelf unit *g* are positioned in the extending end encasements 75 of the grow shelf housing. In this connection and when the grow shelf employed utilizes, as it most commonly the case, a 48 inch fluroescent tube for lighting, the end encasement sections 75 are ordinarily found to be most advantageously sized so that each extends between about 2 or so and 5 or so inches past the interior tube support wall 76 (although there is no real limitation to this), with sometimes good advantage in having the ballast transformers and the like being actually positioned as close to the outermost end of the housing as possible and so set up in the housing that about equal weight is divided and located at each end of the grow shelf housing.

Now then, there are extremely beneficial and advantageous results derivable in such generally preferable construction of a grow shelf unit for utilization in practice of the present invention. In the first place, such an embodiment for a grow shelf in the way the same are utilized in practice of the present invention makes for a structurally very efficient manner to allow support of the nicely and most propitiously weight-balanced grow shelf in the assembly. Thus, the support brackets $r$ upon which the grow shelf is placed may be set (with, of course corresponding employment of appropriately dimensioned lateral stretcher bars $b$) so that the grow shelf rests and bears upon the brackets in such a manner of disposition that both quite stable and also very solid bearing contact is made at the most effective point. This is illustrated by the arrows designated $m$ in FIG. 26 which indicate the major moment of inertia effects encountered in supporting a grow shelf of the described advantageous design. In addition, there is with such a grow shelf absolutely minimized and negligible, if any, interference of light to the plants because of the aptly located presence of the shelf support brackets $s$, which give support under the grow shelf at points without and away from each of the ends of the fluorescent tubes. Grow shelves so embodied as to be placeable in the indicated way further allow very easy and rapid, unobstructed fluorescent tube replacement without any requirement to remove an entire grow shelf unit from an assembly in order to replace a light tube.

Figure 27:
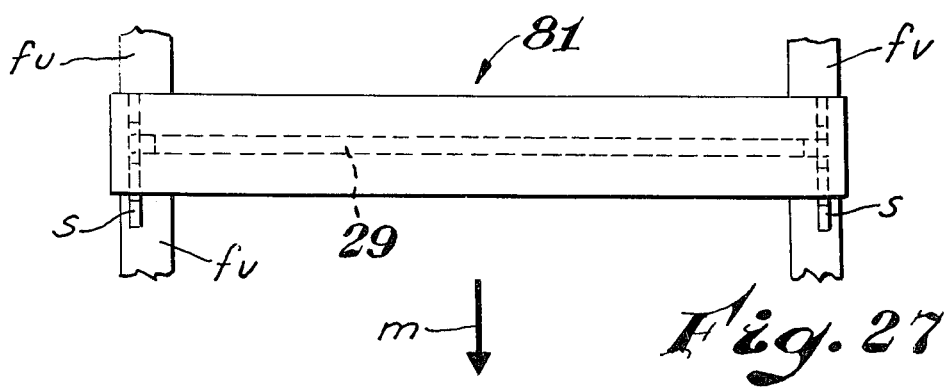

In contrast, FIG. 27 very schematically represents a standard and ordinarily encountered sort of fluorescent light fixture which, of course, can also (albeit to some disadvantage for indicated reasons) be employed in apparatus assemblies according to the invention. In such a commonplace light-providing fixture, the end walls of the housing are very close to the ends of the mounted fluorescent tubes 29 therein with the heavy ballast and other electrical components being generally centrally located in the fixture at such a point as is designated by the reference numeral 81. This places the major moment of inertia, shown again by an arrow $m$, in about the middle of the fixture so that the bearing on support brackets $s$ is not as solid and directly positive as with the grow shelf of FIG. 25. Further, the brackets $s$ normally have to be situate somewhat within the ends of the tubes 29 in order to give safe, proper support to the fixture; this causing both light interference and, of course, awkward difficulty in tube replacement.

As is apparent, practice of the present invention provides apparatus easily adapted to lend optimum contitions for artificial plant growth including excellent means for dealing with problems of light, humidity, heat control (with even the lateral space separating grow shelves set in a plane on opposite sides of the vertical supports providing desirable central heat venting means in the assembly) and so forth giving the growing material greatest benefit and absolutely minimized problems and deleterious influence from the phenomena of phototropism (since side light effects are virtually eliminated) and geotropism (since the plant is directly affected naturally by normal gravity). It also affords exceptional versatility, as has been noted, in apparatus design and construction using the various modular elements involved which are quickly (and most advantageously non-permanently) coupled and positioned together in any desired cooperative, unitary relationship in extremely attractive and utile design patterns and arrangements which can easily be varied for countertop, or table, models (in which the counter surface itself can often be beneficially utilized as a shelf area within the effectiveness of the apparatus) or floor models; all possibly equipped with shelf and accessory elements, as desired and as may be most effective for any given purpose, and built in any appropriate and wanted vertical, lateral or otherwise describable including even a staggered assembly arrangement that is possible to achieve.

Practice of the invention, therefore, provides not only an outstanding and novel combination of necessary hardware to provide extraordinary physical plant growth apparatus assemblies; but from a horticultural point of view and based on the pragmatics and requisites of artificial plant growth gives in its very basis and concept an extraordinary and most beneficial and effective combination of reason and logic for best and most facilely accomplishing the intended purpose and result.

Many changes and modifications can readily be made and adapted in embodiments in accordance with the present invention without substantially departing from its apparent and intended spirit and scope, all in pursuance and accordance with same as is set forth and defined in the hereto appended claims.

What is claimed is:

1. Plant growth apparatus for use in artificial light horticulture comprising a plurality of modular elements adapted to be quickly and easily assembled into an integral structure and wherein the relative dispositions of said modular elements within said structure can be readily altered, which apparatus comprises:

a. a pair of upright substantially vertical support columns;
   b. internal support means disposed between said vertical columns to laterally space and rigidize said vertical columns into a base frame;
   c. laterally extending leg portions affixed at the bottom of each of said vertical columns to support said base frame in generally upright fashion;
   d. receptive connecting means at corresponding spaced intervals on the laterally outward face portions of said vertical columns;
   e. at least a pair of laterally extending shelf support brackets having fastening means at their inner ends adapted to be fastened into said receptive connecting means on said vertical columns, each pair of brackets being respectively disposed one on each of said columns at the same vertical position on the same face side of the columns;
   f. an elongate, multiple outlet electric power strip energized by a single external power feed line connection positioned vertically on one of said support columns and extending vertically on said column for at least a portion of the column height, with at least one of the electric outlets in said strip being closely adjacent the fastening point of each of said shelf support brackets disposed on said column;
   g. at least one generally rectangular light-providing shelf unit substantially horizontally disposed upon each pair of said laterally extending support brackets, said light-providing shelf unit comprising:
i. a flat upper surface adapted to hold plant materials and other objects as a shelf area,
ii. an open under section containing laterally disposed therein at least one fluorescent tube light, the area beneath said open under section defining a plant growth area which is substantially as wide as the distance between said column supports, and
iii. end encasement sections extending longitudinally outwardly from said open under section, said encasement sections containing the ballast units and other electrical circuitry for the fluorescent light operation, and wherein said shelf support brackets engage said light-providing shelf unit outside said plant growth area at said end encasement sections.

2. The apparatus of claim 1 wherein said power strip is contained within one of said vertical columns.

3. The apparatus of claim 1 additionally comprising roller means on said laterally extending leg portions to permit movement of the apparatus.

4. The apparatus of claim 1 additionally comprising an electric current timer device capable of opening and closing the external power feed of said power strip in order to automatically control in predetermined sequence the light supply to said plant growth area.

5. The apparatus of claim 1 additionally comprising a rotatable, generally cylindrically arranged clinestat positioned between said vertical columns and wherein at least one of said light-providing shelf units projects over said clinestat in a spaced, generally tangential plane relative to said clinestat.

6. The apparatus of claim 5 wherein at least two of said light-providing shelf units are positioned tangentially over said clinestat on opposite sides of said vertical columns.

7. The apparatus of claim 1 wherein at least one of said light-providing shelf units is substantially vertically disposed at the extremity of at least one pair of said laterally extending shelf bracket supports.

8. The apparatus of claim 1 additionally comprising an unlighted base shelf unit positioned under at least one of said light-providing shelf units on at least one side of said vertical support columns.

9. The apparatus of claim 8 having at least two of said unlighted shelf units and at least two of said light-providing shelf units and wherein at least one of each of said units is supported on opposite sides of said vertical columns.

10. The apparatus of claim 8 wherein at least two of said light-providing shelf units are supported on said vertical columns one over the other.

11. The apparatus of claim 8 wherein at least two of said light-providing shelf units are supported on said brackets in a laterally extending, side-by-side relationship.

12. The apparatus of claim 8 additionally comprising at least one transparent box-like, plant growth enclosure curtain suspended from one of said light-providing shelf units to enclose the plant growth area beneath said shelf unit.

13. The apparatus of claim 12, wherein said enclosure curtain comprises a five-sided open-bottomed box of a transparent, flexible plastic material with its dependent sides being unattached to one another at the vertical side edges.

14. The apparatus of claim 13 wherein said enclosure curtain has reflectorized inner side wall surfaces.

15. The apparatus of claim 8 additionally comprising at least one flexible transparent sheet having a reflectorized inner surface suspended from an outer lateral edge of at least one of said light-providing shelf units and extending down to an immediately adjacent lower shelf unit.

16. The apparatus of claim 15 wherein said reflectorized sheet is suspended by and suppliable from a window shade roller type device.

17. The apparatus of claim 8 additionally comprising means for plant growth irrigation.

18. The apparatus of claim 8 additionally comprising means for plant growth humidification.

19. The apparatus of claim 1 wherein at least two of said light-providing shelf units are supported on said vertical columns one over the other.

20. The apparatus of claim 1 wherein at least two of said light-providing shelf units are supported on said brackets in a laterally extending, side-by-side relationship.

* * * * *